Jan. 10, 1967  P. DENNERLEIN  3,297,127
CONTINUOUSLY MOVING STAIRWAY
Filed Nov. 2, 1964  2 Sheets-Sheet 1

Inventor:
PAUL DENNERLEIN
By Harris and Nydick
ATTORNEYS

Inventor:
PAUL DENNERLEIN

United States Patent Office 3,297,127
Patented Jan. 10, 1967

3,297,127
CONTINUOUSLY MOVING STAIRWAY
Paul Dennerlein, Krahhahnstrasse 15, Kassel, Germany
Filed Nov. 2, 1964, Ser. No. 408,131
Claims priority, application Germany, Nov. 19, 1963,
D 42,978/63
5 Claims. (Cl. 198—16)

The present invention relates to continuously moving stairways, also known as escalators, for transporting persons and merchandise. The supporting surfaces of such stairways, such as the steps, are interconnected by endless link chains which are driven by suitable power drive means driving gear pulleys engaged with the chains.

One of the problems with continuously moving stairways of this kind is to maintain a uniform speed of the chains, usually one on each side of the stairway being provided. Obviously, the uniformity of the run of the chains is affected by the number and size of the links of which the chains are composed. The general practice is to provide four to eight links per step, whereby even a comparatively short moving stairway requires two hundred forty to two hundred eighty links for its chains. Chain links, however well designed and manufactured, tend to stretch, particularly when the load as represented by persons or merchandise is not centered on the steps of the stairway, as is the case more often than not. Furthermore, chains require careful and rather frequent lubrication. Excess lubricant, when gradually and unavoidably mixed with environmental dirt, becomes a rather abrasive mass.

As a result of the afore-pointed-out inherent operational conditions, the chains become noisy and begin to run irregularly after a relatively short time, and also are subjected to heavy wear. Pronounced wear also occurs at the pulleys driving the chains, due to the fact that the pulleys in engagement with the forward run of the chains must be driven, whereby rather powerful vectors of force acting upon the pulleys and also upon the supports and guides for the chains are set up.

Continuously moving stairways as heretofore known also make it difficult to provide reliable fail-safe devices.

It is a broad object of the invention to provide a novel and improved continuously moving stairway which has a long useful life, requires little servicing and does not become noisy after a brief period of service.

A specific object of the invention is to provide a novel and improved continuously moving stairway which has considerably fewer components than moving stairways of this type as heretofore known and is less expensive to manufacture than conventional stairways of comparable length.

Another specific object of the invention is to provide a novel and improved continuously moving stairway which is automatically stopped or otherwise rendered safe in the event the stairway ceases to function normally, for instance, if it is jammed.

The aforementioned objects, features and advantages and other objects and advantages which will be pointed out hereinafter are attained by replacing the conventional chain drive with its many links by a single rigid member, such as a rack, for each step of the stairway and by driving an elongated endless transmission loop formed by pivotally linking said rigid members by one or several drive members, such as pinions in engagement with the rigid transmission members for driving the same. The driving member or members may be so arranged that they simultaneously engage the preferably substantially rectilinear forward run and the preferably substantially rectilinear return run of the transmission loop. Such an arrangement produces favorable moments of force for the transmission of the driving force and also relief of the stresses acting upon the guide members of the stairway.

Since a transmission formed of racks or other driven members is usually provided on each lengthwise side of the stairway, the driving members are preferably arranged in pairs.

Instead of racks driven by pinions, bars having lengthwise spaced dogs or lugs may be provided as driven members, and drag chains engageable with the dogs or lugs as driving members.

The rigid driving members are preferably provided in the housing for the stairway and are linked by cross pins which may mount rollers at each end guided in a suitable guide track of the housing.

The invention provides as fail-safe means arcuate control members at one or both ends of the endless transmission loop. The members are preferably pivotal about an axis and spring loaded so that they will yield in response to a pressure engagement by the driven members due to any fault in the operation of the stairway, for instance, jamming. The resulting pivotal movement of the control members may be utilized to operate one or several safety switches which when operated initiate suitable control actions, such as stopping of the stairway.

In the accompanying drawing several preferred embodiments of the invention are shown by way of illustration, and not by way of limitation.

Figure 1:
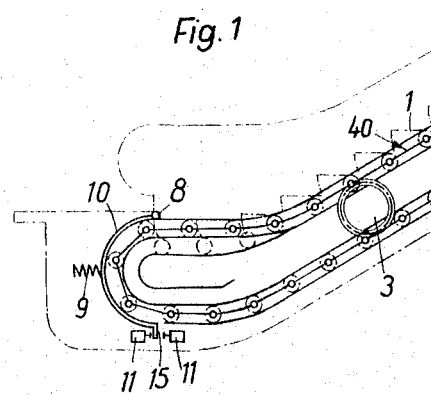
FIG. 1 is a diagrammatic elevational side view of a continuously moving stairway according to the invention.
Figure 2:
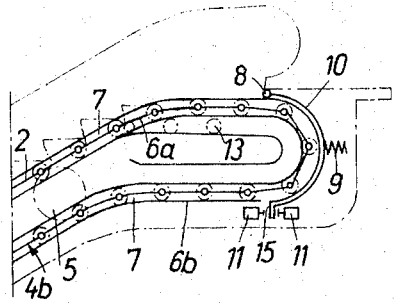
FIG. 2 is a fragmentary detailed view of FIG. 1 on an enlarged scale.
Figure 2:
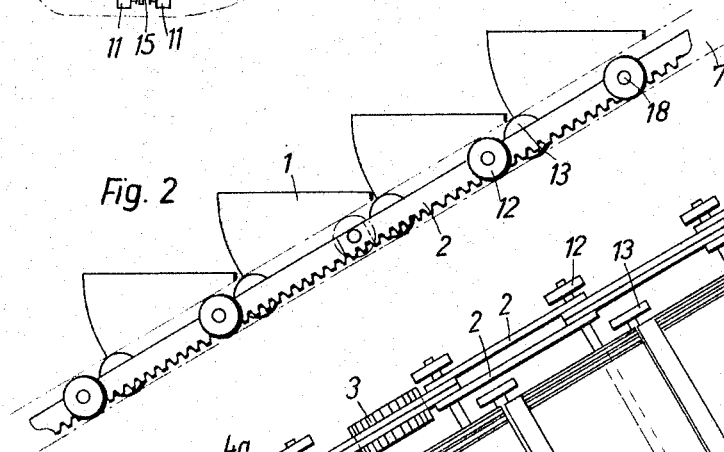
Figure 3:
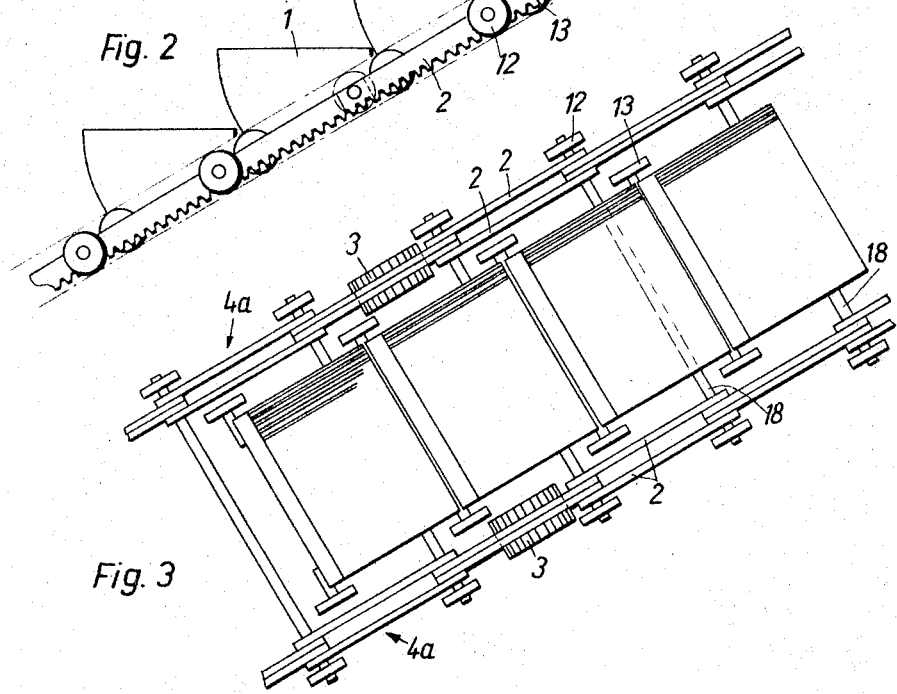
FIG. 3 is a plan view of FIG. 2.

Referring first to FIGS. 1, 2 and 3 in detail, the exemplified stairway comprises a plurality of steps 1, each of which is pivotal about an axle 18. Each step is further supported by means of rollers 13. Axles 18 are also used to hinge together the respective ends of a plurality of rigid members 2, shown as racks. The length of each rach is substantially equal to the distance between two axles 18. Each axle, in addition to the racks, further supports at each end a roller 12, which is guided in a guide track, such as a groove 7 in the housing encasing the entire stairway, as is diagrammatically indicated by the chain link lines.

As is evident, the pivotally joined racks, which are disposed along opposite sides of the steps, constitute elongated endless transmission loops 4a and 4b. The racks are driven by pairs of pinions 3. While basically one pair of driving pinions is sufficient, it is generally advisable to provide several pairs for stairways of considerable length, a second pair of pinions 5 being shown.

As can best be seen in FIG. 2, each transmission loop has a substantially rectilinear upper or forward run and a substantially rectilinear lower or return run. The two pairs of driving pinions 3 and 5 are so arranged that they simultaneously engage both runs of the transmission loops. The reversal of the loops at the ends of the runs is guided by guide members 6a and 6b, which are substantially relieved of the load by the afore-described arrangement of pinions 3 and 5.

At one or both reversal ends of the transmission loops, arcuate control members 10 are provided which are pivotal about pivot shafts 8 and biased by springs 9 into the illustrated operational positions. The free ends of one or both members 10 are used to control switches 11. As is evident from FIG. 1, both members occupy positions clear of the switches in the normal operational positions of the control members, but will engage and operate one or the other of the switches if the control members perform a pivotal movement due to any fault in the operation of the stairway, such as jamming thereof, causing displacement of the racks and the axles 18 in reference to control members 10. The operation of switches 11 is utilized to initiate suitable control functions, such as stopping of the stairway, in a conventional and readily apparent manner.

Figure 4:
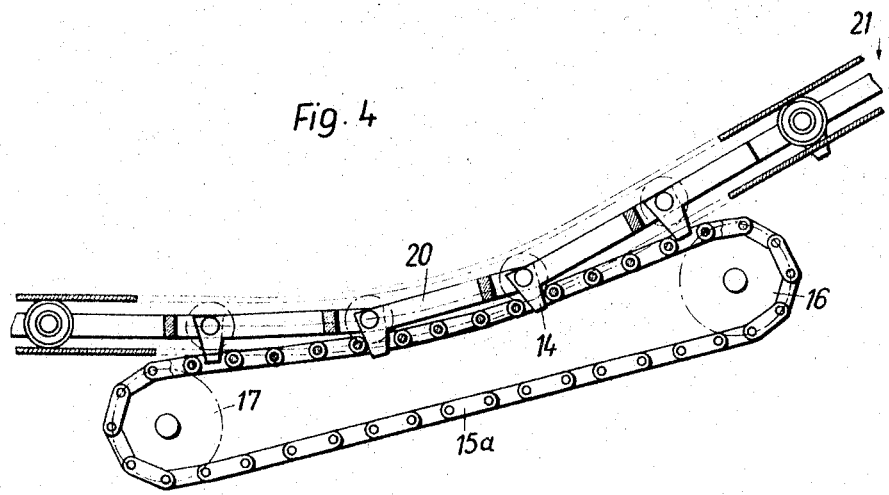
FIG. 4 is a diagrammatic elevational view of a modification of the stairway.

The stairway according to FIG. 4 is similar in principle to that of FIGS. 1, 2 and 3, except that the racks 2 of the preceding figures are replaced by bars 20 supporting dogs or lugs 14. These dogs or lugs are in engagement with drag chains 15a, which are guided about pulleys 16 and 17. As is evident, bars 20 which are pivotally joined by axles such as axles 18, again form endless transmission loops 21, one transmission loop being provided on each side of the steps. The drag chains preferably cooperate with an upward run of transmission loops 21.

Racks 2 and bars 20 may be made of a non-metallic material, such as a suitable plastic.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A continuously moving stairway comprising, in combination, a housing including a pair of grooves each defining an endless guide track having two slanted substantially parallel rectilinear portions superimposed spaced apart in a vertical plane and a curved portion at each end of said rectilinear portions joining the same, said grooves being disposed mutually parallel and spaced apart in a horizontal relationship, a plurality of toothed racks, hinge means pivotally joining each two adjacent racks to form two endless conveyors, each of said conveyors being disposed in one of said guide track grooves for movement along the base thereof, a plurality of steps for supporting persons and merchandise thereon, each of said steps being disposed between the conveyors and coupled to one of said racks of each conveyor for movement in unison therewith, and a power driven gear between said superimposed rectilinear guide track portions of each conveyor at the lower part thereof in simultaneous driving engagement with successive racks passing through said rectilinear portions thereby driving the conveyor along said guide track.

2. A continuously moving stairway according to claim 1 wherein each of said hinge means comprises a roller engaged with one of said guide track grooves for guidance therein.

3. A continuously moving stairway according to claim 1, and comprising a pair of curved safety guides each encompassing one of said curved guide track portions on the outside thereof and spaced apart therefrom, each of said guides being transversely displaceable in reference to the racks passing through the curved guide track portions, and spring means bias said curved guides toward the racks passing between the guides and the curved guide track portion.

4. A continuously moving stairway according to claim 3 and comprising a pivot means at one end of each of said guides for pivoting said guides about an axis defined by said pivot means, said racks while passing the curved guides being engageable with the same to effect a pivotal movement thereof against the action of said spring means.

5. A continuously moving stairway according to claim 4 and comprising a switch means disposed adjacent to the other end of each of the curved guides, each of said switch means including a switch contact mounted on said other end for movement in unison with the same and a stationary switch contact engageable with the movable switch contact in a predetermined pivotal position of the respective curved guide, said switch means being included in a control circuit actuated by operation of either of said switch means.

References Cited by the Examiner
UNITED STATES PATENTS

| | | | |
|---|---|---|---|
| 950,796 | 3/1910 | Seeberger | 198—18 |
| 1,023,443 | 4/1912 | Seeberger | 198—18 |
| 1,682,014 | 8/1928 | Margles et al. | 198—232 |
| 1,729,079 | 9/1929 | Margles et al. | 198—232 |
| 2,641,351 | 6/1953 | Riley | 198—203 X |
| 2,648,423 | 8/1953 | Black | 198—203 |
| 2,802,427 | 8/1957 | Da Costa | 198—18 X |

SAMUEL F. COLEMAN, Primary Examiner.

EVON C. BLUNK, Examiner.

R. E. KRISHER, A. C. HODGSON, Assistant Examiners.